United States Patent
Jacobs et al.

[11] Patent Number: 5,844,790
[45] Date of Patent: Dec. 1, 1998

[54] SPLIT-BOOST CONVERTER HAVING DAMPED EMI ISOLATION FILTER AND METHOD OF OPERATION THEREOF

[75] Inventors: Mark E. Jacobs, Dallas; Yimin Jiang, Plano, both of Tex.

[73] Assignee: Lucent Technologies Inc., Murray Hill, Del.

[21] Appl. No.: 906,539

[22] Filed: Aug. 5, 1997

[51] Int. Cl.[6] .................................................. H02M 1/12
[52] U.S. Cl. .......................... 363/47; 323/222; 323/225; 327/551; 307/71; 307/91
[58] Field of Search .................................. 363/44, 45, 47, 363/48, 60; 323/222, 225, 232, 272, 364, 233; 327/551, 552; 307/89, 91, 71, 104, 109, 110

[56] References Cited

U.S. PATENT DOCUMENTS

| | | | |
|---|---|---|---|
| 5,530,396 | 6/1996 | Vlatkovic et al. | 327/552 |
| 5,636,112 | 6/1997 | Faulk | 363/45 X |
| 5,668,707 | 9/1997 | Barrett | 363/44 |
| 5,687,070 | 11/1997 | Jacobs et al. | 323/222 X |

OTHER PUBLICATIONS

Document entitled "An Improved High–Efficiency Rectifier for Telecom Applications" by M.E. Jacobs. R.W. Farrington, G.H. Fasullo, Y. Jiang, R.J. Murphy, V.J. Thottuvelil, K.J. Timm of Bell Laboratories, Lucent Technologies, Mesquite, Texas 75149; pp. 1–6.

*Primary Examiner*—Peter S. Wong
*Assistant Examiner*—Y. J. Han

[57] ABSTRACT

For use in a split-boost converter having a DC input, first and second outputs, a power train interposed between the DC input and the first and second outputs, a damped electromagnetic interference (EMI) filter circuit and method of reducing the EMI. In one embodiment, the EMI filter circuit includes (1) an EMI filter interposed between the power train and the second output, the EMI filter subject to oscillation from line disturbances arriving at the DC input and (2) a conductive path, coupling a rail of the second output to the DC input, that routes at least a portion of the line disturbances from the DC input directly to the second output to damp the oscillation of the EMI filter.

20 Claims, 2 Drawing Sheets

SPLIT-BOOST CONVERTER HAVING DAMPED EMI ISOLATION FILTER AND METHOD OF OPERATION THEREOF

TECHNICAL FIELD OF THE INVENTION

The present invention is directed, in general, to power conversion and, more specifically, to a split-boost converter having a damped electromagnetic emissions ("EMI") isolation filter and method of reducing the EMI in the split-boost converter.

BACKGROUND OF THE INVENTION

Boost converters are commonly used in high power factor applications as line conditioners. The boost stage processes the AC input and develops a DC output voltage, typically 400 V or 800 V. Boost converters are typically the topology of choice for providing a high output voltage (e.g., 400 V or 800 V) from substantially lower input DC voltages derived from sinusoidal input voltages. In applications with high AC input voltage (e.g., 320 to 480 VAC rms) where an intermediate DC bus voltage 700 to 800 V is necessary, a soft-switched boost is often used to maintain the overall efficiency of a power supply. For lower AC input voltage applications, a simple snubber to slow down the turn-off of the boost diode is all that is necessary to obtain a boost efficiency of 96–98%. In recent years, several new topologies have been proposed in which the semiconductor switching losses are minimized by adding an auxiliary active circuit. The addition of the auxiliary circuit is an elegant solution but it results in increased cost and complexity. A recent paper by Y. Jiang and F. C. Lee, entitled "Three-Level Boost Converter for Application in Single Phase Power Factor Correction," Virginia Power Electronics Center (VPEC) Power Electronics Seminar Proceedings, 1994, Virginia Polytechnic Institute and State University, Blacksburg, Virginia, pp. 127–133 suggests a configuration for a boost stage that accommodates semiconductor devices rated for approximately half the normal output voltage, (e.g., $V_0/2$) for use in high voltage, single-phase applications. Jiang and Lee's circuit, which they call a three-level boost, provides two unparallelable but equal output voltages. By reducing the maximum voltage stresses across the semiconductor devices, a zero-voltage switching topology becomes less important to maintain high efficiency. In addition to reducing the voltage stresses across all semiconductor devices to half of the normal output bus voltage, the three-level boost also decreases the size of the boost inductor without compromising EMI performance.

There are several EMI sources that need to be successfully defeated in order to assure the effective and long term stable operation of the boost converter. Two major EMI sources include the boost switching frequency and random disturbances originating from the incoming AC lines themselves.

Accordingly, what is needed in the art is an EMI filter circuit that adequately filters the boost switching frequency and its associated harmonics. What is further needed is adequate damping to stabilize and dissipate these AC line EMI disturbances without detrimentally affecting the capability of the EMI filter to adequately filter the boost switching frequency and without introducing a highly dissipative circuit element.

SUMMARY OF THE INVENTION

To address the above-discussed deficiencies of the prior art, the present invention provides, for use in a split-boost converter having a DC input, first and second outputs, a power train interposed between the DC input and the first and second outputs, a damped electromagnetic interference (EMI) filter circuit and method of reducing the EMI. In one embodiment, the EMI filter circuit includes (1) an EMI filter interposed between the power train and the second output, the EMI filter subject to oscillation from line disturbances arriving at the DC input and (2) a conductive path, coupling a rail of the second output to the DC input, that routes at least a portion of the line disturbances from the DC input directly to the second output to damp the oscillation of the EMI filter.

The present invention not only addresses EMI associated with a switching frequency of the split-boost converter, but also addresses the random disturbances originating from the incoming AC lines themselves. Accordingly, the EMI filter circuit includes an EMI filter to filter the boost switching frequency (and its associated harmonics) and a conductive path that facilitates the damping of any oscillations that may develop within the EMI filter. The EMI filter is generally designed to have a high Q characteristic, rendering it vulnerable to oscillation and eventual saturation (for instance, of a common mode inductor employed therein). Saturation of the EMI filter places switches within the power train at risk. With the present invention, oscillations are damped before they can lead to saturation and harm to the power train.

In one embodiment of the present invention, the conductive path includes a resistive element. Damping, in this embodiment, is provided with the resistive element (e.g., a resistor) in the conductive path. Other places have too much DC component while others have too much sustained AC component which may require larger than desired damping component power ratings and result in overall reduced efficiencies due to additional power losses. A relatively small resistance may be advantageously placed in the conductive path to reduce a current component in any inductor in the EMI filter. The broad scope of the present invention does not, however, require such a resistive element.

In one embodiment of the present invention, a rectifier provides a DC voltage to the DC input of the split-boost converter. In an embodiment to be illustrated and described, the rectifier is a three-phase rectifier. Of course, the basic split-boost converter topology is a DC/DC converter. If conversion from AC is required, a passive or active rectifier should be provided.

In one embodiment of the present invention, the EMI filter is an LC filter coupling the rail of the second output to another rail thereof and coupling the other rail to ground. In a related embodiment, the EMI filter includes an inductor coupling the rail of the second output to another rail thereof. Those skilled in the art are familiar with other topologies for EMI filters. The present invention is not limited to a particular topology for the EMI filter.

In one embodiment of the present invention, the conductive path couples the rail of the second output to a node between the DC input and a power inductor of the split-boost converter. This node has a DC voltage approximating that of the rail of the second output and contains relatively little AC component, allowing the conductive path to avoid conducting sustained DC or AC currents.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
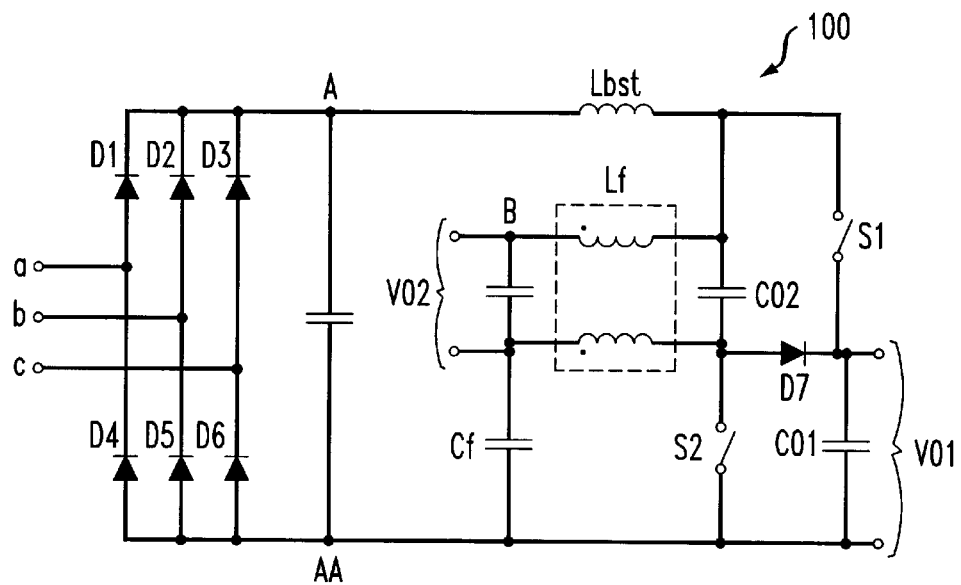
FIG. 1 illustrates a schematic diagram of a split-boost converter employing an embodiment of an EMI filter constructed according to the principles of the present invention.

Referring initially to FIG. 1, illustrated is a schematic diagram of a split-boost converter (hereinafter referred to as converter) 100 employing an embodiment of an EMI filter constructed according to the principles of the present invention. The converter 100 is a DC to DC topology showing two output circuits with essentially equal DC output voltages $V_{O1}$, $V_{O2}$. A power train of the converter is interposed between a DC input (designated across nodes A and AA) and the first and second outputs (designated by the DC output voltages $V_{O1}$, $V_{O2}$). The converter 100 includes an boost inductor $L_{bst}$ (the boost power inductor), a pair of capacitors $C_{O1}$, $C_{O2}$ (the output capacitors), a pair of active switches S1, S2, and a passive switch D7 (the boost diode). The capacitors $C_{O1}$, $C_{O2}$ are relatively large and the voltages across them are essentially constant during one switching cycle. Since these two output capacitors $C_{O1}$, $C_{O2}$ are isolated, the boost stage can supply two independent output loads. Conventional control circuitry (not shown) drives the active switches S1, S2 and therefore is not described herein.

The switches S1, S2 are closed and opened at the same time (i.e., synchronously). When the switches S1, S2 are closed, this causes the two capacitors $C_{O1}$, $C_{O2}$ to be connected in parallel since the diode D7 is non-conducting in this mode. A current through the boost inductor $L_{bst}$ increases linearly storing energy in the output capacitors $C_{O1}$, $C_{O2}$ or transferring it to the output loads, as long as the condition $V_O/2 < V_{in} < V_O$ holds [where the output voltage $V_O$ is equal to the first or second output voltage $V_{O1}$, $V_{O2}$ and the input voltage $V_{in}$ is the rectified AC line voltage supplied by a rectifier bridge (including diodes D1, D2, D3, D4, D5, D6)]. It is the meeting of this last condition that makes this topology well suited to a three phase application using the six-diode bridge rectifier to drive the split-boost stage as shown. When the switches S1, S2 are open, the boost inductor $L_{bst}$ is reset through the diode D7 and the now series combination of the capacitors $C_{O1}$, $C_{O2}$.

The two output voltages $V_{O1}$, $V_{O2}$ are maintained essentially equal since the capacitors $C_{O1}$, $C_{O2}$ are connected in parallel at switch S1, S2 closure even if the loads across the two outputs $V_{O1}$, $V_{O2}$ are not equal. Computer simulations indicate that an imbalance of only a couple of volts may result between the two output capacitors $C_{O1}$, $C_{O2}$ for a 50% load imbalance.

Quality performance of the converter 100 necessitates that the two output voltages $V_{O1}$, $V_{O2}$ be substantially EMI-quiet, and that the converter 100 itself respond in a stable and successful manner to dissipate EMI disturbances without adversely affecting its general overall operation. The first output voltage $V_{O1}$ is inherently EMI-quiet in the converter 100. However, one of the practical issues in designing a split-boost converter 100 is to filter the "bouncing" high-side DC output of the second output voltage $V_{O2}$ with respect to ground in order to make it a substantially EMI-quiet output also. This common-mode bouncing is caused by the boost switching frequency.

The EMI filter may be appropriately designed and placed in the converter 100 to effectively remove this common-mode EMI disturbance. One embodiment of this EMI filter is a LC filter (including a filter inductor $L_f$ and filter capacitor $C_f$) shown in FIG. 1. This LC filter produces a substantially EMI-quiet output at the second output voltage $V_{O2}$ if the corner frequency of this LC filter combination is significantly lower than the boost switching frequency.

Minimizing the peak current levels through the switches S1, S2 is also an important design consideration. Larger ratios $L_f/C_f$ for the filter inductor $L_f$ and filter capacitor $C_f$ are advantageous since they produce higher characteristic impedances which in turn reduce the filter current through the switches S1, S2. Typically, larger values of the filter inductor $L_f$ may be obtained by constructing the filter inductor $L_f$ in a common-mode manner which allows accommodation of a large differential load current. Additionally, high permeability core materials can be used which generally contribute to larger inductance values for the filter inductor $L_f$ as well. As a result, the Q factor of this filter may be made very high thereby enhancing its boost switching frequency filtering effectiveness.

This advantage, however, may be somewhat offset by a high Q circuit's propensity to "ring" or oscillate when presented with spurious environmental disturbances. Although a short period of oscillation may not necessarily affect the proper operation of the converter 100, a practical problem may occur in that the filter inductor $L_f$ normally saturates at a low current value since it is usually constructed to have a large common-mode inductance using a high permeability core as previously stated.

If the filter inductor $L_f$ saturates, all the energy stored in the filter capacitor $C_f$ will be dissipated in the second switch S2. If such oscillations occur too frequently, the energy lost in the second switch S2 will be excessive and may even cause failure of this device. Therefore, this LC filter circuit would profit from being more highly damped in order for the converter 100 to operate efficiently and survive repetitive EMI disturbances.

An approach to reducing Q in LC filter circuits is to add a resistive device either in series or parallel. Resistance in series with an inductor poses problems in that it must accommodate high DC current levels and therefore higher than desirable power dissipations. Resistance in parallel with the inductor typically must accommodate high levels of AC or RF voltages which the circuit is filtering and may therefore also encounter higher than desired power dissipation situations as well. Resistance placed in parallel with a capacitor will also encounter high DC voltage levels and higher than desired loses.

It has been determined that the most damaging, repetitive EMI disturbances usually come from the AC lines which drive the converter 100. Often these disturbances are produced by the operation of high power equipment which is also being fed from these same AC lines. These EMI disturbances often contain frequencies that are near the corner frequency of the EMI filter and therefore easily excite the EMI filter to oscillate.

In summary, the EMI filter is more efficient in attenuating the boost switching frequency when operated in a high Q configuration. However, the EMI filter contributes more efficiently to overall converter operation by attenuating and dissipating other spurious and often lower frequency disturbances when operated in a more highly damped mode. The addition and placement of a path to facilitate the damping of spurious disturbances without unduly affecting boost switching frequency attenuation or causing too large a damping device power dissipation would be advantageous.

Figure 2:
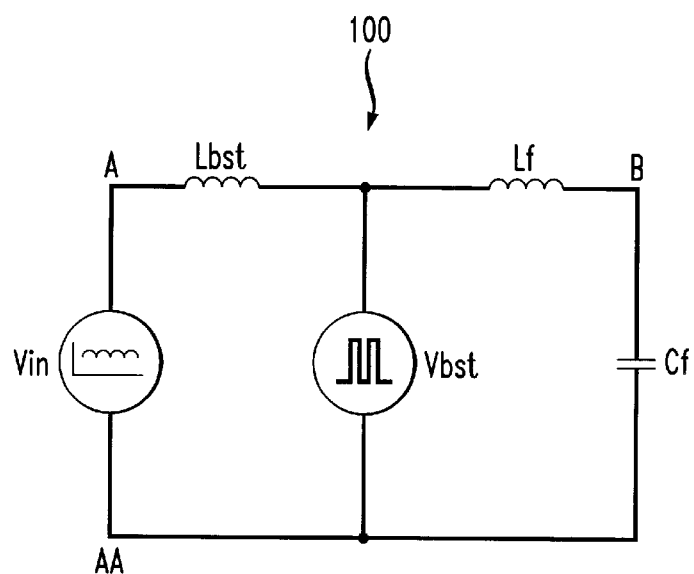
FIG. 2 illustrates a simplified schematic diagram of the converter of FIG. 1.

Turning now to FIG. 2, illustrated is a simplified schematic diagram of the converter 100 of FIG. 1. The equivalent circuit diagram, derived from FIG. 1, shows the rectified AC line voltage $V_{in}$ and the boost switching voltage $V_{bst}$ as well as several key circuit elements. These circuit elements are the boost inductor $L_{bst}$, the filter inductor $L_f$ and the filter capacitor $C_f$. From this equivalent filter circuit, several observations can be made. First, the purpose of the LC filter is to attenuate the boost switching actions represented by the boost switching voltage $V_{bst}$ in FIG. 2, not the AC line disturbances. Secondly, although the inductors $L_{bst}$, $L_f$ have high pulse width modulation (PWM) voltages across them, the voltage from the node marked "A" to the node marked "B" is not only EMI-quiet but also essentially zero.

These two observations suggest that the placement of an additional conductive path from node "A" to node "B" can fulfill the requirements of increasing the EMI filter circuit damping for AC line generated disturbances without sacrificing the EMI filter's ability to effectively attenuate EMI effects from the boost switching frequency. Additionally, since there is no sustained voltage difference between node "A" and node "B", the electrical structure added will not lower the efficiency of the converter 100 through additional power loses.

Figure 3:
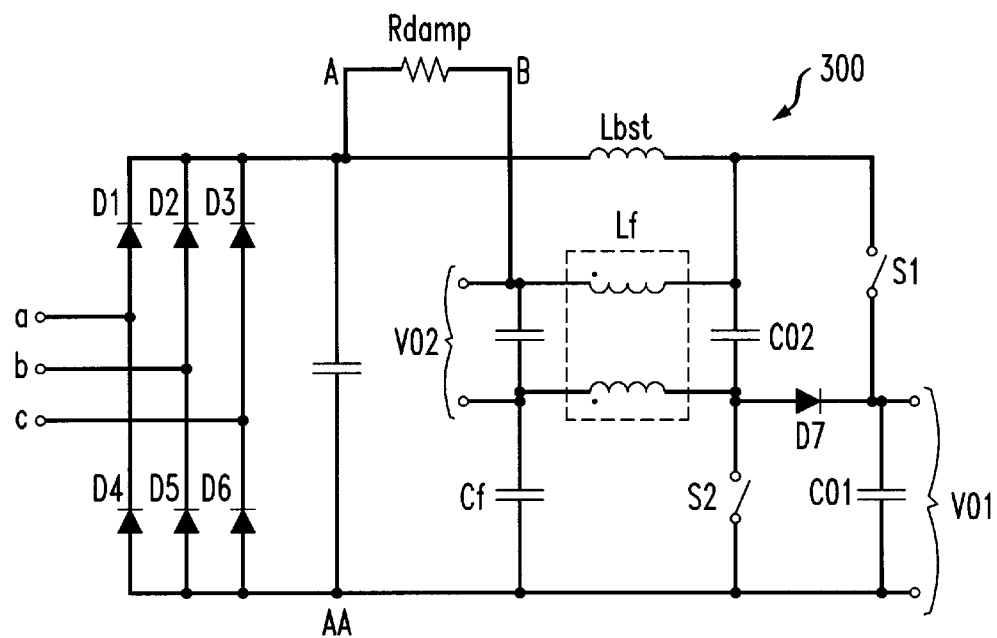
FIG. 3 illustrates a schematic diagram of a split-boost converter employing an embodiment of an EMI filter circuit constructed according to the principles of the present invention.
Figure 4:
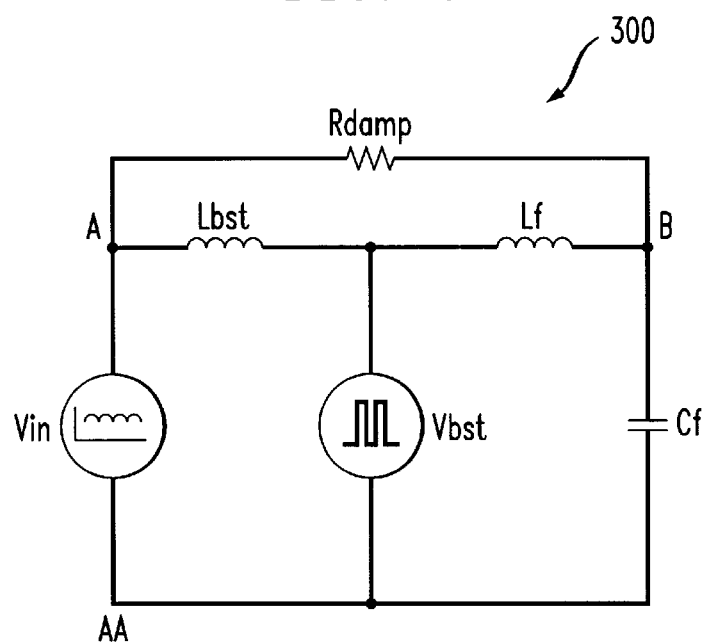
FIG. 4 illustrates a simplified schematic diagram of the converter of FIG. 3.

Turning now to FIGS. 3 and 4, illustrated are schematic and simplified schematic diagrams of a split-boost converter (hereinafter referred to as a converter) 300 employing an embodiment of an EMI filter circuit constructed according to the principles of the present invention. In this advantageous embodiment of the present invention, the EMI filter circuit includes an EMI filter (e.g., an LC filter including a filter inductor $L_f$ and filter capacitor $C_f$) and a damping resistive element $R_{damp}$ in a conductive path between node "A" and node "B.". When the value of this resistance is selected as hereinafter described, it can effectively damp oscillations due to AC line disturbances very well without sacrificing the boost switching frequency attenuation characteristics of the LC filter significantly due to the existence of a boost inductor $L_{bst}$. The power loss in the resistive element $R_{damp}$ placed between in the conductive path is also very small since very little voltage is applied across it.

The resistive element $R_{damp}$ can be as low as zero ohm and the AC line disturbances will show up directly at node "B" without going through the inductors $L_{bst}$, $L_f$ thereby avoiding circuit oscillations. However, because the filter inductor $L_f$ is a "common-mode" inductor with a large inductance that can be saturated at small common-mode current levels, tying node "A" and node "B" together ($R_{damp}=0$) may drive the filter inductor $L_f$ into saturation during transients when the current in the boost inductor $L_{bst}$ changes rapidly. Alternately, with non-zero values of resistive element $R_{damp}$ between nodes "A" and "B", any small DC current build-up in the filter inductor $L_f$ must also pass through the resistive element $R_{damp}$. The voltage drop across the resistive element $R_{damp}$ will diminish the effect of this DC current on the filter inductor $L_f$. The value of the resistive element $R_{damp}$ can be chosen large enough to keep the filter inductor $L_f$ out of saturation and small enough to damp oscillations due to AC line disturbances. In a practical design, this rule leaves substantial freedom to choose a value of the resistive element $R_{damp}$ to allow proper operation.

The EMI filter circuit (including the EMI filter and the conductive path and resistive element $R_{damp}$) is now illustrated in a more detailed view of the split-boost converter 300. As an example of this embodiment of the invention, a split boost converter 300 was constructed using circuit values of $L_{bst}=100$ microhenrys, $L_f=600$ microhenrys and $C_f=1$ microfarad yielding a characteristic impedance of approximately 26 ohms. A 20 ohm resistance was selected for resistive element $R_{damp}$. Two 10 ohm, 3 watt resistors (forming the resistive element $R_{damp}$) were placed in series between nodes "A" and "B". A temperature rise of only 20 degrees C was observed across the series resistors forming the resistive element $R_{damp}$ even under severe, repetitive AC line (e.g., 360 Hz) disturbance conditions while the converter 300 was observed to perform well in successfully absorbing these disturbances.

From the above description, it is apparent that the present invention provides, for use in a split-boost converter having a DC input, first and second outputs, a power train interposed between the DC input and the first and second outputs, a damped electromagnetic interference (EMI) filter circuit and method of reducing the EMI. In one embodiment, the EMI filter circuit includes (1) an EMI filter interposed between the power train and the second output, the EMI filter subject to oscillation from line disturbances arriving at the DC input and (2) a conductive path, coupling a rail of the second output to the DC input, that routes at least a portion of the line disturbances from the DC input directly to the second output to damp the oscillation of the EMI filter.

For a better understanding of split-boost converters see "An Improved High Efficiency Rectifier for Telecom Applications," by Jacobs, et al., Proceedings of INTELEC 1996, p. 530 et seq. (October 1996), which is incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. For use in a split-boost converter having a DC input, first and second outputs, a power train interposed between said DC input and said first and second outputs, a damped electromagnetic interference (EMI) filter circuit, comprising:

an EMI filter interposed between said power train and said second output, said EMI filter subject to oscillation from line disturbances arriving at said DC input; and a conductive path, coupling a rail of said second output to said DC input, that routes at least a portion of said line disturbances from said DC input directly to said second output to damp said oscillation of said EMI filter.

2. The circuit as recited in claim 1 wherein said conductive path includes a resistive element.

3. The circuit as recited in claim 1 wherein a rectifier provides a DC voltage to said DC input of said split-boost converter.

4. The circuit as recited in claim 3 wherein said rectifier is a three-phase rectifier.

5. The circuit as recited in claim 1 wherein said EMI filter is an LC filter coupling said rail of said second output to another rail thereof and coupling said other rail to ground.

6. The circuit as recited in claim 1 wherein said EMI filter includes an inductor coupling said rail of said second output to another rail thereof.

7. The circuit as recited in claim 1 wherein said conductive path couples said rail of said second output to a node between said DC input and a power inductor of said split-boost converter.

8. For use in a split-boost converter having a DC input, first and second outputs, a power train interposed between said DC input and said first and second outputs, a method for reducing electromagnetic interference (EMI), comprising the steps of:

provoiding an EMI filter interposed between said power train and said second output, said EMI filter subject to oscillation from line disturbances arriving at said DC input;

establishing a conductive path between a rail of said second output to said DC input; and routing at least a portion of said line disturbances from said DC input directly to said second output to damp said oscillation of said EMI filter.

9. The method as recited in claim 8 wherein said step of establishing said conductive path comprises the step of providing a resistance in said conductive path.

10. The method as recited in claim 8 further comprising the step of providing a DC voltage to said DC input of said split-boost converter with a rectifier.

11. The circuit as recited in claim 10 wherein said rectifier is a three-phase rectifier.

12. The method as recited in claim 8 wherein said EMI filter is an LC filter coupling said rail of said second output to another rail thereof and coupling said other rail to ground.

13. The method as recited in claim 8 wherein said EMI filter includes an inductor coupling said rail of said second output to another rail thereof.

14. The method as recited in claim 8 wherein said step of establishing comprises the step of coupling said rail of said second output to a node between said DC input and a power inductor of said split-boost converter.

15. A split-boost converter, comprising:

a DC input;

first and second outputs;

a power train interposed between said DC input and said first and second outputs, said power train including a power inductor;

an electromagnetic interference (EMI) filter interposed between said power train and said second output, said EMI filter subject to oscillation from line disturbances arriving at said DC input; and a conductive path, coupling a rail of said second output to a node between said DC input and said power inductor, that routes at least a portion of said line disturbances from said DC input directly to said second output to damp said oscillation of said EMI filter.

16. The split-boost converter as recited in claim 15 wherein said conductive path includes a resistive element.

17. The split-boost converter as recited in claim 15 further comprising a rectifier, coupled to said DC input, that provides a DC voltage to said DC input.

18. The circuit as recited in claim 17 wherein said rectifier is a three-phase rectifier.

19. The split-boost converter as recited in claim 15 wherein said EMI filter is an LC filter coupling said rail of said second output to another rail thereof and coupling said other rail to ground.

20. The split-boost converter as recited in claim 15 wherein said EMI filter includes an inductor coupling said rail of said second output to another rail thereof.

* * * * *